(12) United States Patent
Goel et al.

(10) Patent No.: US 10,149,024 B1
(45) Date of Patent: Dec. 4, 2018

(54) SYSTEMS AND METHODS FOR MULTIPLE DATA CENTER BUILDING OPTICAL COMMUNICATION

(71) Applicant: Facebook, Inc., Menlo Park, CA (US)

(72) Inventors: Nitin Kumar Goel, Mountain View, CA (US); Sung Woo Choe, Fremont, CA (US); Gayathrinath Nagarajan, Saratoga, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/876,547

(22) Filed: Jan. 22, 2018

(51) Int. Cl.
G02B 6/26 (2006.01)
H04Q 11/00 (2006.01)
H04B 10/278 (2013.01)
H04L 12/28 (2006.01)
H04J 14/02 (2006.01)

(52) U.S. Cl.
CPC ....... H04Q 11/0005 (2013.01); H04B 10/278 (2013.01); H04J 14/0267 (2013.01); H04L 12/2885 (2013.01); H04Q 11/0067 (2013.01); H04Q 2011/0016 (2013.01); H04Q 2011/0024 (2013.01); H04Q 2011/0041 (2013.01); H04Q 2011/0052 (2013.01)

(58) Field of Classification Search
CPC ........... H04Q 11/0005; H04Q 11/0067; H04Q 2011/0016; H04Q 2011/0041; H04Q 2011/0024; H04Q 2011/0052; H04J 14/0267; H04L 12/2885; H04B 10/278
See application file for complete search history.

(56) References Cited

U.S. PATENT DOCUMENTS

| | | | |
|---|---|---|---|
| 8,358,932 B2 | 1/2013 | Adhikari | |
| 8,842,988 B2 | 9/2014 | Spock | |
| 9,204,207 B2 | 12/2015 | Deruijter | |
| 9,247,325 B2 | 1/2016 | Patel | |
| 9,288,555 B2 | 3/2016 | Srinivas | |
| 9,337,931 B2 | 5/2016 | Srinivas | |
| 9,602,434 B1 | 3/2017 | Saleh | |
| 9,648,401 B2 | 5/2017 | Yan | |
| 9,699,530 B2 | 7/2017 | Morgan | |
| 2011/0097083 A1 | 4/2011 | Barrett | |
| 2017/0064698 A1* | 3/2017 | Fujinami | H04W 24/02 |

* cited by examiner

*Primary Examiner* — Ellen Kim
(74) *Attorney, Agent, or Firm* — FisherBroyles, LLP

(57) ABSTRACT

The disclosed systems for multiple data center building optical communication may include (1) a first optical switching node of a first main point of entry (MPOE) of a first data center building that communicatively couples a first fiber pair of a first long-haul path to a computing system of the first building, (2) a second optical switching node of the first MPOE of the first building that communicatively couples a first fiber pair of a second long-haul path to the computing system of the first building, and (3) a third optical switching node of the first MPOE of the first building that communicatively couples the first and second optical switching nodes of the first MPOE of the first building to a second MPOE of the first building and a first MPOE of a second data center building. Various other systems and methods are also disclosed.

20 Claims, 8 Drawing Sheets

SYSTEMS AND METHODS FOR MULTIPLE DATA CENTER BUILDING OPTICAL COMMUNICATION

BACKGROUND

In some data center environments, multiple long-haul optical communication paths from a wide area network (e.g., via an Internet backbone network) may be communicatively coupled to a data center building that houses one or more computing systems, such as web servers, application servers, data storage systems, and so on. The use of multiple long-haul paths may provide a certain level of path diversity to the data center building, so that the failure of a single path does not prohibit access to the computing systems in the building. Moreover, in addition to the multiple long-haul paths, the data center building may provide more than one main point of entry (MPOE) for each of the long-haul paths, with each MPOE providing optical and/or electrical communication components coupling one or more long-haul paths to the computing systems of that building. As a result, the failure of one MPOE at the building will not prevent access to the computing systems of that building.

However, in such data center environments, a single failure (e.g., a power failure affecting the entire data center building) may still isolate the computing systems of the data center from access by the long-haul optical paths, even if the computing systems of the building remain in an operational state, as all MPOEs provided by that building may become inoperative under such circumstances.

SUMMARY

As will be described in greater detail below, the instant disclosure describes systems and methods for multiple data center building optical communication. In one example, a system may include (1) a first optical switching node of a first main point of entry (MPOE) of a first data center building that communicatively couples a first fiber pair of a first long-haul optical path carrying a first plurality of optical channels to at least one computing system of the first data center building, (2) a second optical switching node of the first MPOE of the first data center building that communicatively couples a first fiber pair of a second long-haul optical path carrying a second plurality of optical channels to the at least one computing system of the first data center building, and (3) a third optical switching node of the first MPOE of the first data center building that communicatively couples the first optical switching node and the second optical switching node of the first MPOE of the first data center building to a second MPOE of the first data center building and a first MPOE of a second data center building.

In some examples, the system may also include a first colorless optical add-drop multiplexer (COADM) and a second COADM of the first MPOE of the first data center building, each of which couples the first optical switching node and the second optical switching node of the first MPOE of the first data center building to the at least one computing system of the first data center building. In further examples, the system may also include (1) at least one router of the first MPOE of the first data center building that is communicatively coupled to the at least one computing system of the first data center building, (2) a first set of transponders of the first MPOE of the first data center building that couples the first COADM of the first MPOE of the first data center building to the at least one router of the first MPOE of the first data center building, and (3) a second set of transponders of the first MPOE of the first data center building that couples the second COADM of the first MPOE of the first data center building to the at least one router of the first MPOE of the first data center building.

In some embodiments, each of first optical switching node, the second optical switching node, and the third optical switching node of the first MPOE of the first data center building may include (1) at least one amplifier that amplifies at least one optical channel for transmission on the first long-haul optical path or the second long-haul optical path, (2) at least one wavelength selective switch (WSS) that routes at least one optical channel to at least one other optical switching node, and (3) at least one optical splitter coupled to the at least one WSS.

In an example, the system may further include (1) a first optical switching node of the first MPOE of the second data center building that communicatively couples a second fiber pair of the first long-haul optical path carrying a third plurality of optical channels to at least one computing system of the second data center building, (2) a second optical switching node of the first MPOE of the second data center building that communicatively couples a second fiber pair of the second long-haul optical path carrying a fourth plurality of optical channels to the at least one computing system of the second data center building, and (3) a third optical switching node of the first MPOE of the second data center building that communicatively couples the first optical switching node and the second optical switching node of the first MPOE of the second data center building to a second MPOE of the second data center building and the third optical switching node of the first MPOE of the first data center building. In a further embodiment, the system may include (1) a first meet-me vault (MMV) that is coupled to the first optical switching node of the first MPOE of the first data center building via the first fiber pair of the first long-haul optical path and to the first optical switching node of the first MPOE of the second data center building via the second fiber pair of the first long-haul optical path, and (2) a second MMV that is coupled to the second optical switching node of the first MPOE of the first data center building via the first fiber pair of the second long-haul optical path and to the second optical switching node of the first MPOE of the second data center building via the second fiber pair of the second long-haul optical path.

In some examples, the system may also include (1) a fourth optical switching node of the first MPOE of the first data center building that communicatively couples a third fiber pair of a third long-haul optical path carrying a third plurality of optical channels to the at least one computing system of the first data center building, and (2) a fifth optical switching node of the first MPOE of the first data center building that communicatively couples a fourth fiber pair of a fourth long-haul optical path carrying a fourth plurality of optical channels to the at least one computing system of the first data center building. In such examples, the third optical switching node of the first MPOE of the first data center building may communicatively couple the fourth optical switching node and the fifth optical switching node of the first MPOE of the first data center building to the second MPOE of the first data center building and the first MPOE of the second data center building.

In some embodiments, the first data center building may receive electrical power from a first point of attachment to an electrical grid, and the second data center building ma receive electrical power from a second point of attachment to the electrical grid different from the first point of attachment.

In an example, the system may also include (1) a first optical switching node of the second MPOE of the first data center building that communicatively couples a first fiber pair of a third long-haul optical path carrying a third plurality of optical channels to the at least one computing system of the first data center building, (2) a second optical switching node of the second MPOE of the first data center building that communicatively couples a first fiber pair of a fourth long-haul optical path carrying a fourth plurality of optical channels to the at least one computing system of the first data center building, and (3) a third optical switching node of the second MPOE of the first data center building that communicatively couples the first optical switching node and the second optical switching node of the second MPOE of the first data center building to a second MPOE of the second data center building and the third optical switching node of the first MPOE of the first data center building. Additionally, in some examples, the system may include (1) a first optical switching node of the first MPOE of the second data center building that communicatively couples a second fiber pair of the first long-haul optical path carrying a fifth plurality of optical channels to at least one computing system of the second data center building, (2) a second optical switching node of the first MPOE of the second data center building that communicatively couples a second fiber pair of the second long-haul optical path carrying a sixth plurality of optical channels to the at least one computing system of the second data center building, (3) a first optical switching node of the second MPOE of the second data center building that communicatively couples a second fiber pair of the third long-haul optical path carrying a seventh plurality of optical channels to at least one computing system of the second data center building, (4) a second optical switching node of the second MPOE of the second data center building that communicatively couples a second fiber pair of the fourth long-haul optical path carrying an eighth plurality of optical channels to the at least one computing system of the second data center building, (5) a third optical switching node of the first MPOE of the second data center building that communicatively couples the first optical switching node and the second optical switching node of the first MPOE of the second data center building to the second MPOE of the second data center building and the third optical switching node of the first MPOE of the first data center building, and (6) a third optical switching node of the second MPOE of the second data center building that communicatively couples the first optical switching node and the second optical switching node of the second MPOE of the second data center building to the third optical switching node of the first MPOE of the second data center building and the third optical switching node of the second MPOE of the first data center building.

In one example, another system may include (1) a first main point of entry (MPOE) of a first data center building coupled to a first fiber pair of a first long-haul optical path and a first fiber pair of a second long-haul optical path, (2) a first MPOE of a second data center building coupled to a second fiber pair of the first long-haul optical path, a second fiber pair of the second long-haul optical path, and the first MPOE of the first data center building, (3) a second MPOE of the first data center building coupled to a first fiber pair of a third long-haul optical path, a first fiber pair of a fourth long-haul optical path, and the first MPOE of the first data center building, and (4) a second MPOE of the second data center building coupled to a second fiber pair of the third long-haul optical path, a second fiber pair of the fourth long-haul optical path, the first MPOE of the second center building, and the second MPOE of the first data center building, wherein the first MPOE and the second MPOE of the first data center building are coupled to at least one computing system of the first data center building, and the first MPOE and the second MPOE of the second data center building are coupled to at least one computing system of the second data center building.

In some embodiments, the system may further include (1) a first MPOE of a third data center building coupled to a third fiber pair of the first long-haul optical path, a third fiber pair of the second long-haul optical path, the first MPOE of the first data center building, and the first MPOE of the second data center building, and (2) a second MPOE of the third data center building coupled to a third fiber pair of the third long-haul optical path, a third fiber pair of the fourth long-haul optical path, the second MPOE of the first data center building, the second MPOE of the second data center building, and the first MPOE of the third data center building, wherein the first MPOE and the second MPOE of the third data center building are coupled to at least one computing system of the third data center building.

In some examples, the first MPOE of the first data center building may include (1) at least one router coupled to the at least one computing system of the first data center building, (2) a first optical switching node that couples the first fiber pair of the first long-haul optical path to the at least one router, and (3) a second optical switching node that couples the first fiber pair of the second long-haul optical path to the at least one router. In an additional embodiment, the first MPOE of the first data center building may further include a third optical switching node that couples the first optical switching node and the second optical switching node to the first MPOE of the second data center building and the second MPOE of the first data center building.

In one example, a method may include (1) communicatively coupling, by a first optical switching node of a first main point of entry (MPOE) of a first data center building, a first fiber pair of a first long-haul optical path carrying a first plurality of optical channels to at least one computing system of the first data center building, (2) communicatively coupling, by a second optical switching node of the first MPOE of the first data center building, a first fiber pair of a second long-haul optical path carrying a second plurality of optical channels to the at least one computing system of the first data center building, and (3) communicatively coupling, by a third optical switching node of the first MPOE of the first data center building, the first optical switching node and the second optical switching node of the first MPOE of the first data center building to a second MPOE of the first data center building and a first MPOE of a second data center building.

In some embodiments, the method may further include (1) communicatively coupling, by a first optical switching node of the first MPOE of the second data center building, a second fiber pair of the first long-haul optical path carrying a third plurality of optical channels to at least one computing system of the second data center building, (2) communicatively coupling, by a second optical switching node of the first MPOE of the second data center building, a second fiber pair of the second long-haul optical path carrying a fourth plurality of optical channels to the at least one computing system of the second data center building, and (3) communicatively coupling, by a third optical switching node of the first MPOE of the second data center building, the first optical switching node and the second optical switching node of the first MPOE of the second data center building to a second MPOE of the second data center building and the third optical switching node of the first MPOE of the first data center building.

In some examples, the method may also include (1) communicatively coupling, by a first optical switching node of the second MPOE of the first data center building, a first fiber pair of a third long-haul optical path carrying a third plurality of optical channels to the at least one computing system of the first data center building, (2) communicatively coupling, by a second optical switching node of the second MPOE of the first data center building, a first fiber pair of a fourth long-haul optical path carrying a fourth plurality of optical channels to the at least one computing system of the first data center building, and (3) communicatively coupling, by a third optical switching node of the second MPOE of the first data center building, the first optical switching node and the second optical switching node of the second MPOE of the first data center building to a second MPOE of the second data center building and the third optical switching node of the first MPOE of the first data center building. Moreover, in an embodiment, the method may further include (1) communicatively coupling, by a first optical switching node of the first MPOE of the second data center building, a second fiber pair of the first long-haul optical path carrying a fifth plurality of optical channels to at least one computing system of the second data center building, (2) communicatively coupling, by a second optical switching node of the first MPOE of the second data center building, a second fiber pair of the second long-haul optical path carrying a sixth plurality of optical channels to the at least one computing system of the second data center building, (3) communicatively coupling, by a first optical switching node of the second MPOE of the second data center building, a second fiber pair of the third long-haul optical path carrying a seventh plurality of optical channels to at least one computing system of the second data center building, (4) communicatively coupling, by a second optical switching node of the second MPOE of the second data center building, a second fiber pair of the fourth long-haul optical path carrying an eighth plurality of optical channels to the at least one computing system of the second data center building, (5) communicatively coupling, by a third optical switching node of the first MPOE of the second data center building, the first optical switching node and the second optical switching node of the first MPOE of the second data center building to the second MPOE of the second data center building and the third optical switching node of the first MPOE of the first data center building, and (6) communicatively coupling, by a third optical switching node of the second MPOE of the second data center building, to the first optical switching node and the second optical switching node of the second MPOE of the second data center building, the third optical switching node of the first MPOE of the second data center building, and the third optical switching node of the second MPOE of the first data center building.

In some examples, the method may further include (1) coupling, using a first COADM of the first MPOE of the first data center building, the first optical switching node and the second optical switching node of the first MPOE of the first data center building to the at least one computing system of the first data center building, and (2) coupling, using a second COADM of the first MPOE of the first data center building, the first optical switching node and the second optical switching node of the first MPOE of the first data center building to the at least one computing system of the first data center building. In some additional embodiments, the method may further include (1) coupling, using at least one router, the first COADM and the second COADM of the first MPOE of the first data center building to the at least one computing system of the first data center building, (2) converting, using a first set of transponders, between an optical signal protocol of the first COADM and an electrical signal protocol of the at least one router, and (3) converting, using a second set of transponders, between an optical signal protocol of the second COADM and the electrical signal protocol of the at least one router.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
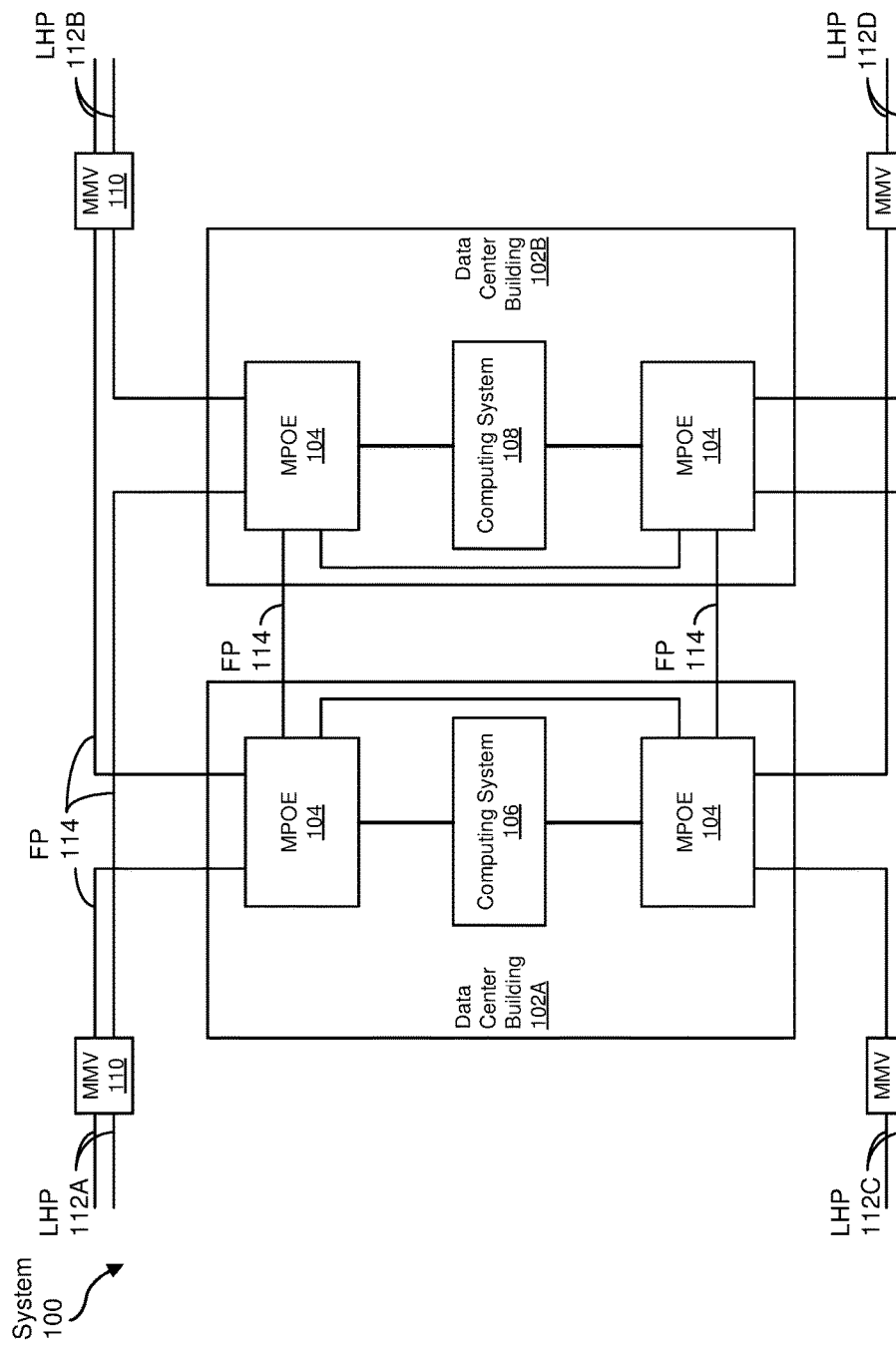
FIG. 1 is a block diagram of an example system for optical communication involving two data center buildings.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for multiple data center building optical communications. As will be explained in greater detail below, embodiments of the instant disclosure include a system of optical communication for multiple data center buildings that may include (1) a first optical switching node of a first main point of entry (MPOE) of a first data center building that communicatively couples a first fiber pair of a first long-haul optical path to a computing system of the first building, (2) a second optical switching node of the first MPOE of the first building that communicatively couples a first fiber pair of a second long-haul optical path to the computing system of the first building, and (3) a third optical switching node of the first MPOE of the first building that communicatively couples the first optical switching node and the second optical switching node of the first MPOE of the first building to a second MPOE of the first building and a first MPOE of a second data center building. By providing these optical switching nodes, failure of a single MPOE of a data center building, or even failure of an entire data center building, will not result in a total loss of access to all computing systems of the data center.

Figure 2:
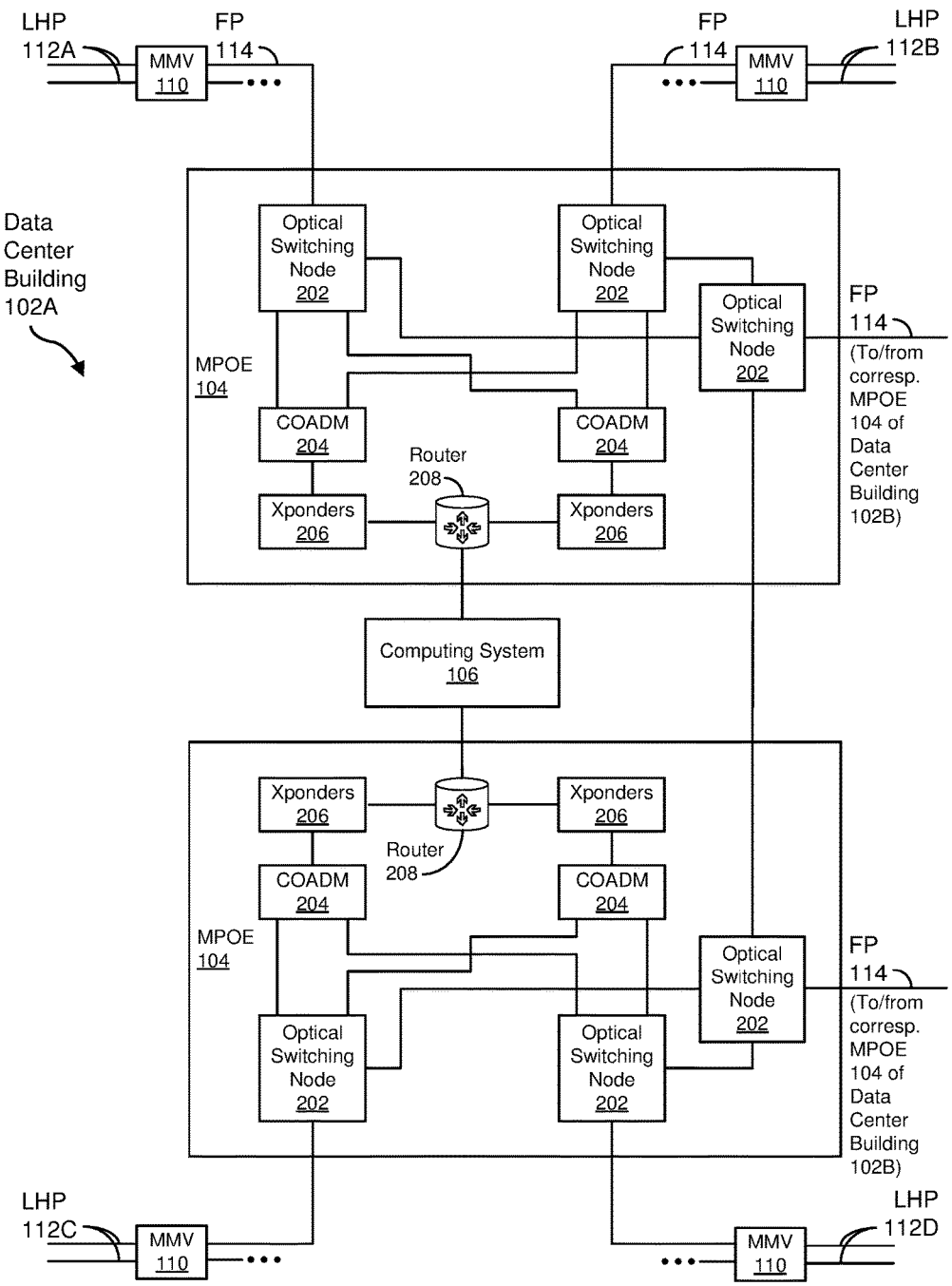
FIG. 2 is a block diagram of an example system portion of the system of FIG. 1 within one of the multiple data center buildings.

The following will provide, with reference to FIGS. 1-8, detailed descriptions of systems and methods for multiple data center building optical communications. Descriptions of example optical communication systems involving a data center with two buildings are provided in conjunction with FIGS. 1 and 2. An example colorless optical add/drop multiplexer (COADM) employable in the example systems of FIGS. 1 and 2 is discussed in relation to FIG. 3, and an example optical switching node that may be used in the example systems of FIGS. 1 and 2 are described in connection to FIG. 4. Example optical communication systems involving a data center with three buildings is provided in relation to FIG. 5. Descriptions of another example optical communication system involving a data center with two buildings are provided in conjunction with FIGS. 6 and 7. Finally, a method for multiple data center building optical communications is discussed in conjunction with FIG. 8.

An optical communication system 100 (or data center system 100) for a data center having multiple buildings is illustrated in FIG. 1. In this example, the data center includes a first data center building 102A that houses at least one computing system 106 and a second data center building 102B that houses at least one computing system 108. Examples of the computing systems 106 and 108 may include, but are not limited to, web servers, application servers, database systems, data storage systems, and so on that may be accessed by way of a plurality of long-haul optical paths (LHP) 112. In an example, a long-haul optical path provides one or more pairs of optical fibers, with each fiber optic pair including one optical fiber carrying data in one direction and another optical fiber carrying data in the opposing direction. Generally, each communication line shown in the blocks diagrams of FIGS. 1, 2, and 5 designates a fiber optic pair 114. Also in some embodiments, each optical fiber may carry multiple optical communication channels, such as DWDM (dense wavelength-division multiplexing) channels. In other examples, fibers carrying optical channels in both directions may be employed. In some examples, each long-haul path 112 may be located along a separate path from a backbone network or other wide-area network to the data center.

As depicted in FIG. 1, each data center building 102 may be equipped with two main points of entry (MPOEs) 104 to diversify the optical interfacing components employed in a single data center building 102. As the term is used herein, an MPOE may be a location, such as an area within data center building 102, at which an outside optical communication network associated with long-haul paths 112 interfaces with customer on-premise communication equipment. In some examples, as shown in FIG. 1, each long-haul path 112 may include two fiber optic pairs 114 that are coupled to a corresponding "meet-me vault" (MMV) 110, which may include one or more splice points, or a fiber patch panel. Each fiber optic pair 114 may exit its corresponding MMV 110 for coupling with a particular MPOE. In some examples, each fiber optic pair 114 of a particular long-haul path 112 is coupled to an MPOE 104 of a different data center building 102 so that a failure of one data center building 102 will not isolate any long-haul path 112 from the data center in its entirety.

In some examples, each data center building 102 may be powered by way of a separate point of attachment to an electrical grid, thus reducing the probability of a single point failure in the electrical grid affecting both data center buildings 102.

More specifically, as indicated in FIG. 1, a first fiber optic pair 114 of a first long-haul path 112A is coupled to a first MPOE 104 of first data center building 102A while a second fiber optic pair 114 of first long-haul path 112A is coupled to a first MPOE 104 of second data center building 102B. Similarly, a first fiber optic pair 114 of a second long-haul path 112B is coupled to first MPOE 104 of first data center building 102A while a second fiber optic pair 114 of second long-haul path 112B is coupled to first MPOE 104 of second data center building 102B. In addition, a first fiber optic pair 114 of a third long-haul path 112C is coupled to a second MPOE 104 of first data center building 102A while a second fiber optic pair 114 of third long-haul path 112C is coupled to a second MPOE 104 of second data center building 102B. Finally, a first fiber optic pair 114 of a fourth long-haul path 112D is coupled to second MPOE 104 of first data center building 102A while a second fiber optic pair 114 of fourth long-haul path 112D is coupled to second MPOE 104 of second data center building 102B. Consequently, in some embodiments, a failure of either data center building 102 will reduce communication bandwidth of each long-haul path approximately in half, but will not isolate any of long-haul paths 112 from the data center entirely.

Furthermore, as illustrated in FIG. 1, first and second MPOEs 104 of first data center building 102A are coupled by a fiber optic pair 114, first and second MPOEs 104 of second data center building 102B are coupled by another fiber optic pair 114, first MPOEs 104 of first data center building 102A and second data center building 102B are coupled by yet another fiber optic pair 114, and second MPOEs 104 of first data center building 102A and second data center building 102B are coupled by another fiber optic pair 114. As a result, optical communication channels may be directed from one MPOE 104 to another, either within the same data center building 102 or between data center buildings 102, in situations in which various equipment failures within a data center building 102 occur.

FIG. 2 is a block diagram of first data center building 102, indicating an optical communication structure for first and second MPOEs 104 there. In some embodiments, second data center building 102 may include a corresponding optical communication structure. As illustrated in FIG. 2, each of first and second MPOEs 104 include a first optical switching node 202 and a second optical switching 202, each of which is coupled with a separate fiber optic pair 114 associated with different long-haul paths 112. Each of first optical switching node 202 and second optical switching node 202 is coupled by a fiber optic pair 114 to a first colorless optical add/drop multiplexer (COADM) 204 and a second COADM 204. An example of COADM 204 is discussed below in conjunction with FIG. 3, and an example of optical switching node 202 (otherwise referred to as a "degree") is described more fully in connection with FIG. 4. As also shown in FIG. 2, each COADM 204 is coupled by an associated fiber optic pair to a corresponding set of transponders 206. In some examples, a set of transponders 206 may convert between an optical signal protocol of COADM 204 (e.g., DWDM optical channel signals) and an electrical signal protocol for a router 208. In one example, a set of transponders may include one or more optical-to-electrical converters. Router 208 may be coupled to both sets of transponders 206, and may route the electrical signals of transponders 206 to and from computing system 106 of first data center building 102A.

Further included in each of first MPOE 104 and second MPOE 104, as indicated in FIG. 2, may be a third optical switching node 202 coupled to each of first and second optical switching nodes 202 of the same MPOE 104. In some examples, third optical switching node 202 of first MPOE 104 may also be coupled to third optical switching node 202 of second MPOE 104 of first data center building 102A and/or first MPOE 104 of second data center building 102B. In some embodiments, third optical switching node 202 of second MPOE 104 of first data center building 102A may be coupled to other optical switching nodes 202 in a correspondingly similar manner. As shown in FIG. 2, each optical switching node 202 may be a four-port optical switching node 202, or an optical switching node 202 of degree 4. In other examples, each optical switching node 202 may include a number of ports greater than or equal to a number of fiber optic pairs 114 to which optical switching node 202 is to be connected.

Each optical switching node 202 and COADM 204 may be configured, as well as reconfigured from time to time, in response to detection of one or more failures or other errors in various components of each MPOE 104 (or in response to detection of one or more failures of a fiber optic pair 114 or long-haul path 112 associated with an MPOE 104), including an overall failure of first or second MPOE 104, or an entire data center building 102. Such configuration may be performed by an operator by way of a control system (not shown in FIG. 2), which may include one or more hardware processors and associated memory storing instructions for operating the control system. In other examples, the control system may perform such configuration and reconfiguration automatically.

Figure 3:
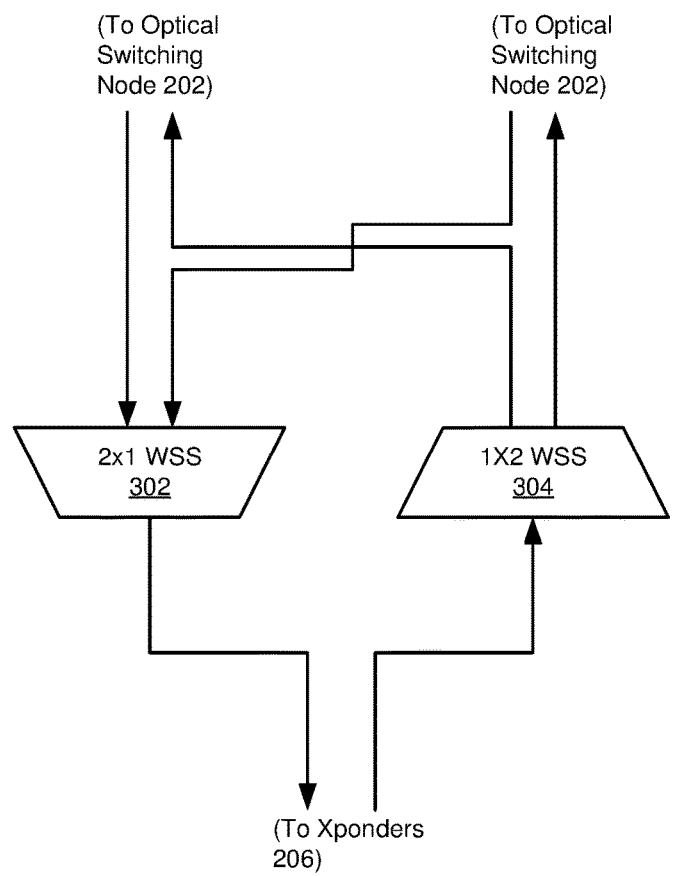
FIG. 3 is a block diagram of an example colorless optical add/drop multiplexer (COADM) employable in the example system portion of FIG. 2.

In some examples, a COADM 204 employed in FIG. 2 may direct selected individual incoming optical channels received from either of two optical switching nodes 202 to transponders 206, and may also direct individual incoming optical channels received from transponders 206 to either of the two optical switching nodes 202 coupled to COADM 204. FIG. 3 illustrates an example COADM 204 that may be used in first or second MPOE 104 of first data center building 102A or second data center building 102B. In this example, an input optical fiber from each optical switching node 202 is coupled to a 2×1 wavelength-selective switch (WSS) 302 (e.g., two input optical fibers and one output optical fiber). At 2×1 WSS 302, selected wavelengths or channels from either or both input optical fibers may be forwarded to an output optical fiber as input to transponders 206. In the opposing direction, an input optical fiber from transponders 206 is coupled to a 1×2 WSS 304. At 1×2 WSS 304, each selected wavelength or channel from the input optical fiber may be directed to either of two output optical fibers, one per optical switching node 202.

While FIG. 3 provides one particular example of COADM 204, other examples of COADM 204 involving other components, such as other types of optical add/drop multiplexers (OADMs), are also possible. In an example, COADM 204 may be a colorless reconfigurable OADM. In another embodiment, COADM 204 may include multiple stages of multiplexing before 2×1 WSS 302 and/or multiple stages of demultiplexing after 1×2 WSS 304. For example, each of eight groups of twelve optical channels may be multiplexed together, and the eight groups may be subsequently multiplexed to form a single group of 96 channels, which may then be presented to 2×1 WSS 302. The channels that are output from 1×2 WSS 304 may be demultiplexed using multiple stages in a similar manner. Other examples of multiplexing and/or demultiplexing multiple channels in one or more stages are also possible.

In other examples, COADM 204 may couple transponders 206 to three or more optical switching nodes 202. In such embodiments, a N×1 WSS and a 1×N WSS, in which N is the number of optical switching nodes 202 coupled to COADM 204, may be employed to select and direct the various optical channels in a fashion similar to that shown in FIG. 3.

In some embodiments, optical switching node 202 may have multiple fiber optic pair 114 ports to which another optical switching node 202, COADM 204, or MMV 110 may be coupled, and may direct any channel of any input optical fiber to a corresponding channel of an output optical fiber of any other fiber optic pair 114 port. In some examples, an optical switching node 202 of degree N indicates that optical switching node 202 is coupled to N separate optic fiber pairs 114 or ports.

Figure 4:
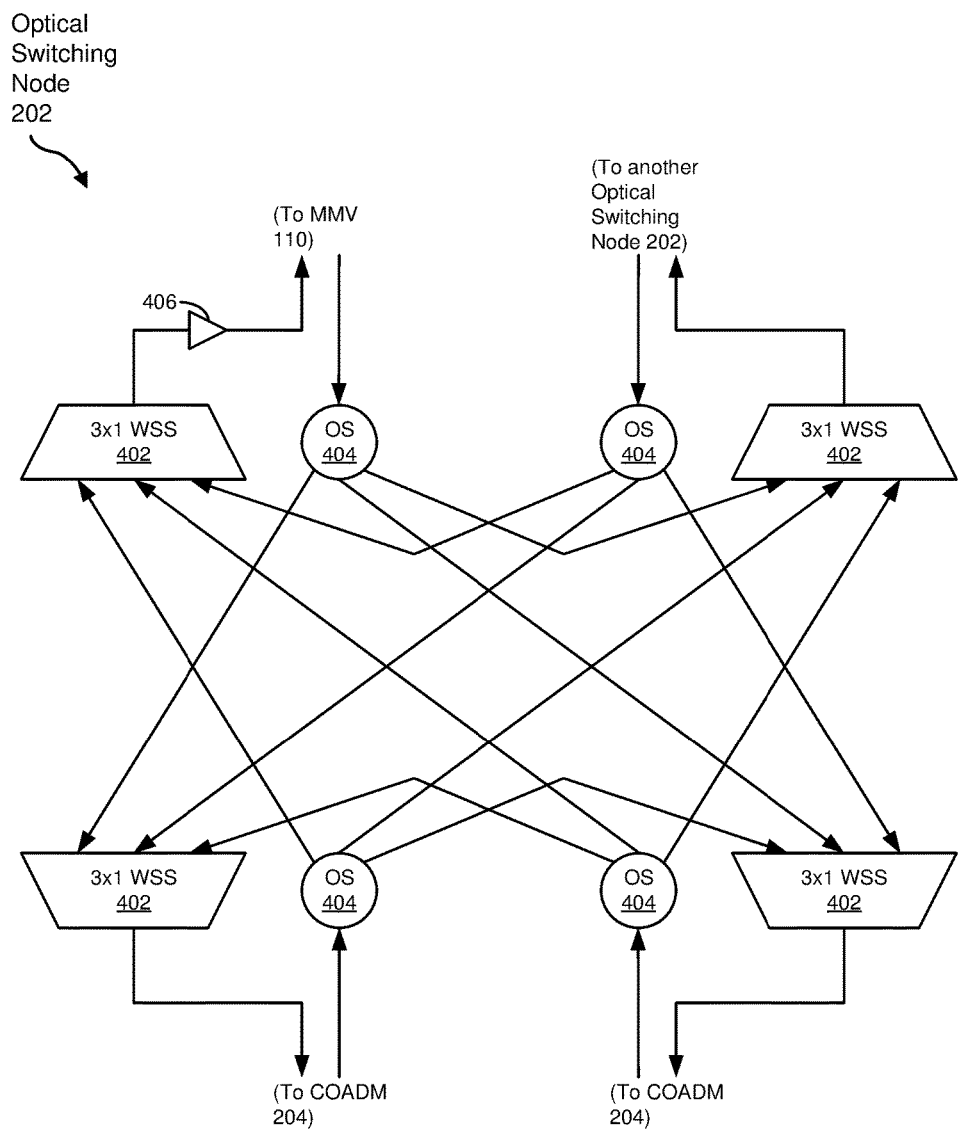
FIG. 4 is a block diagram of an example optical switching node employable in the example system portion of FIG. 2.

FIG. 4 depicts an example optical switching node 202 that may be coupled to an MMV 110, such as first and second optical switching nodes 202 of first or second MPOE 104 of first or second data center building 102, each of which is of degree 4. In this example, each port may be associated with a corresponding 3×1 WSS 402 and a 3-way optical splitter 404. More specifically, each incoming optical fiber is coupled with a separate optical splitter 404, which splits the power of the optical signal three ways, with each output of optical splitter 404 provided to an input of a separate 3×1 WSS 402 for each remaining port. In some embodiments, each 3×1 WSS 402 may select each wavelength or channel from one of its inputs for placement onto an output optical fiber for the corresponding port. Consequently, each input wavelength or channel received at each port may be directed to the corresponding output wavelength or channel of any other port of optical switching node 202.

In some examples, an output optical fiber from optical switching node 202 coupled to an MMV 110 may be supplemented with an optical amplifier 406. In some embodiments, such as third optical switching node 202 of first and second MPOEs 104 of first and second data center buildings 102, optical switching node 202 may not be coupled to MMV 110 or COADM 204, but only to other optical switching nodes 202.

In other embodiments in which more optical switching nodes 202 may be provided in an MPOE 104, optical switching node 202 may have four or more ports. Generally, a N-port optical switching node 202 may employ N optical splitters 404 (one per port), each having N−1 outputs, one per each remaining port. N-port optical switching node 202 may also include an (N−1)×1 WSS 402 for each output optical fiber of each port.

Figure 5:
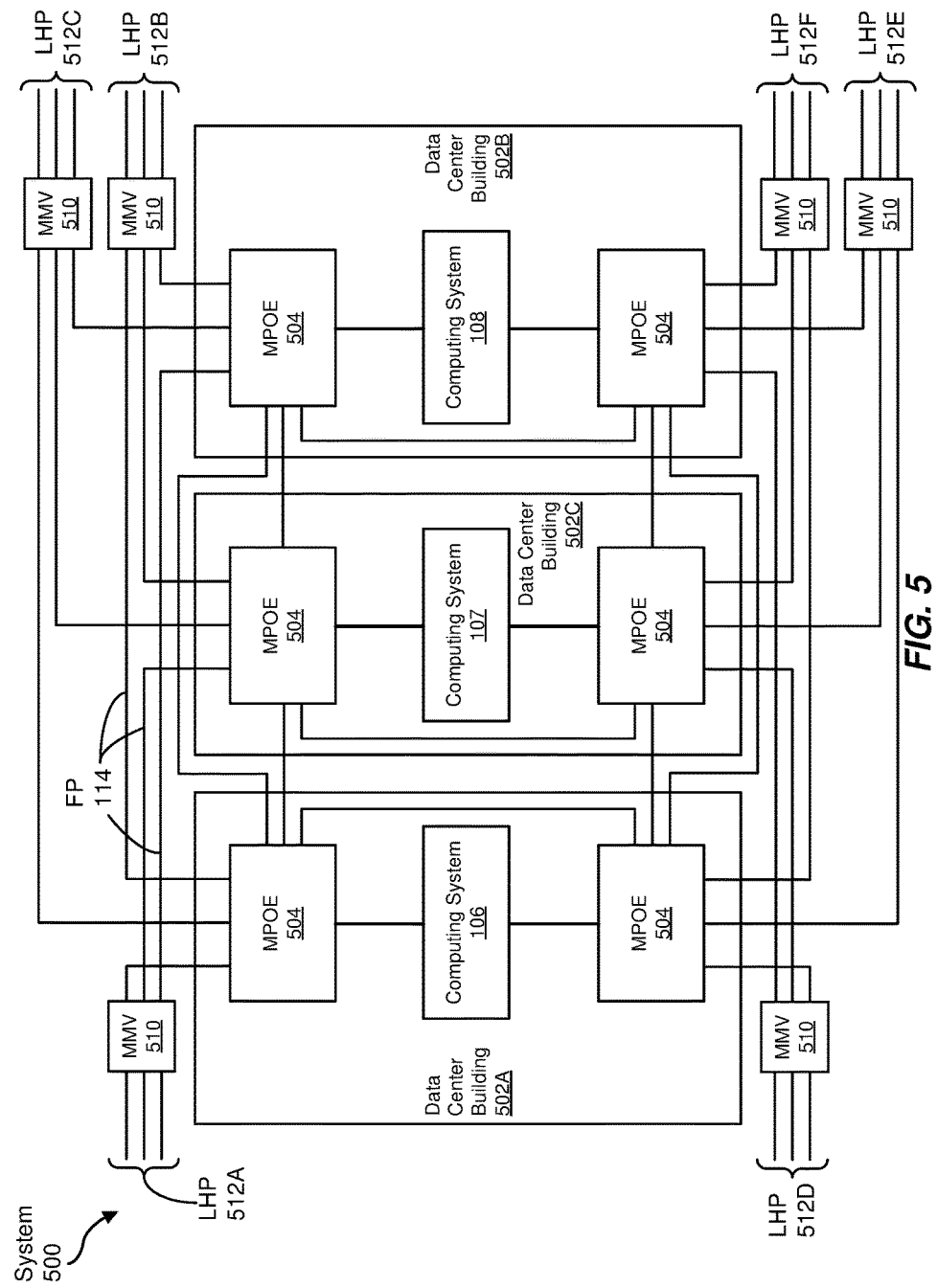
FIG. 5 is a block diagram of an example system for optical communication involving three data center buildings.

In some examples, the system of FIGS. 1 and 2 involving two data center buildings 102A and 102B may be scaled to three or more data center buildings 102, thus providing more path diversity and redundancy. FIG. 5 depicts an example system 500 including three data center buildings 502: a first data center building 502A, a second data center building 502B, and a third data center building 502C, with each housing a corresponding computing system 106, 108, and 107, respectively. As in FIGS. 1 and 2, each data center building 502 may include first and second MPOEs 504. In some examples, each of six long-haul paths 512 may include three fiber optic pairs 114, each of which may be coupled to a separate data center building 502 via an MMV 510. More specifically, each of a first long-haul path 512A, a second long-haul path 512B, and a third long-haul path 512C includes three fiber optic pairs 114, each of which may be coupled to a first MPOE 504 of each data center building 502. Similarly, each of a fourth long-haul path 512D, a fifth long-haul path 512E, and a sixth long-haul path 512F includes three fiber optic pairs 114, each of which may be coupled to a second MPOE 504 of each data center building 502. In some examples, each first and second MPOE 504 of each data center building 502 may also be coupled to the corresponding MPOE 504 in each other data center building 502, as well as the opposing MPOE 504 in the same data center building 502, as depicted in FIG. 5.

By adding a third data center building 502 (e.g., third data center building 502C), two additional long-haul paths 512 are added (for a total of six instead of four, as depicted in FIG. 1), thereby providing additional communication bandwidth to the data center in addition to the increased computing capacity provided by the additional data center building 502. Furthermore, in system 500 a loss of an entire data center building 502 still allows active communication of each long-haul path 512 with the data center.

In some embodiments, each MPOE 504 may have a single router (e.g., router 208 of FIG. 2) coupled to its associated computing system 106, 107, 108. Also in some examples, each MPOE 504 may couple to the router three COADMs (e.g., one for each long-haul path 512), and may include three optical switching nodes (again, one per long-haul path 512). Additionally, each of the three optical switching nodes may be coupled to one of long-haul paths 512, each of the three COADMs, and an additional optical switching node. Moreover, the additional optical switching node may also be coupled to a corresponding additional optical switching node of a corresponding MPOE 504 of each other data center building 502, as well as to the additional optical switching node of the opposing MPOE 504 of the same data center building 502. Consequently, each of the first, second, and third optical switching nodes of MPOE 504 may be of degree 5, while the additional optical switching node of MPOE 504 may be of degree 6. In other embodiments, other configurations of components for each MPOE 504 may be used. In yet other examples, additional data center buildings may be incorporated into the data center, thus increasing capacity, component redundancy, and path diversity with reasonable scaling.

As with the data center of FIGS. 1 and 2, a control system may configure, as well as reconfigure from time to time, the optical switching nodes, COADMs, and other components of each MPOE 504 of FIG. 5, either automatically or under the direction of a system operator.

Figure 6:
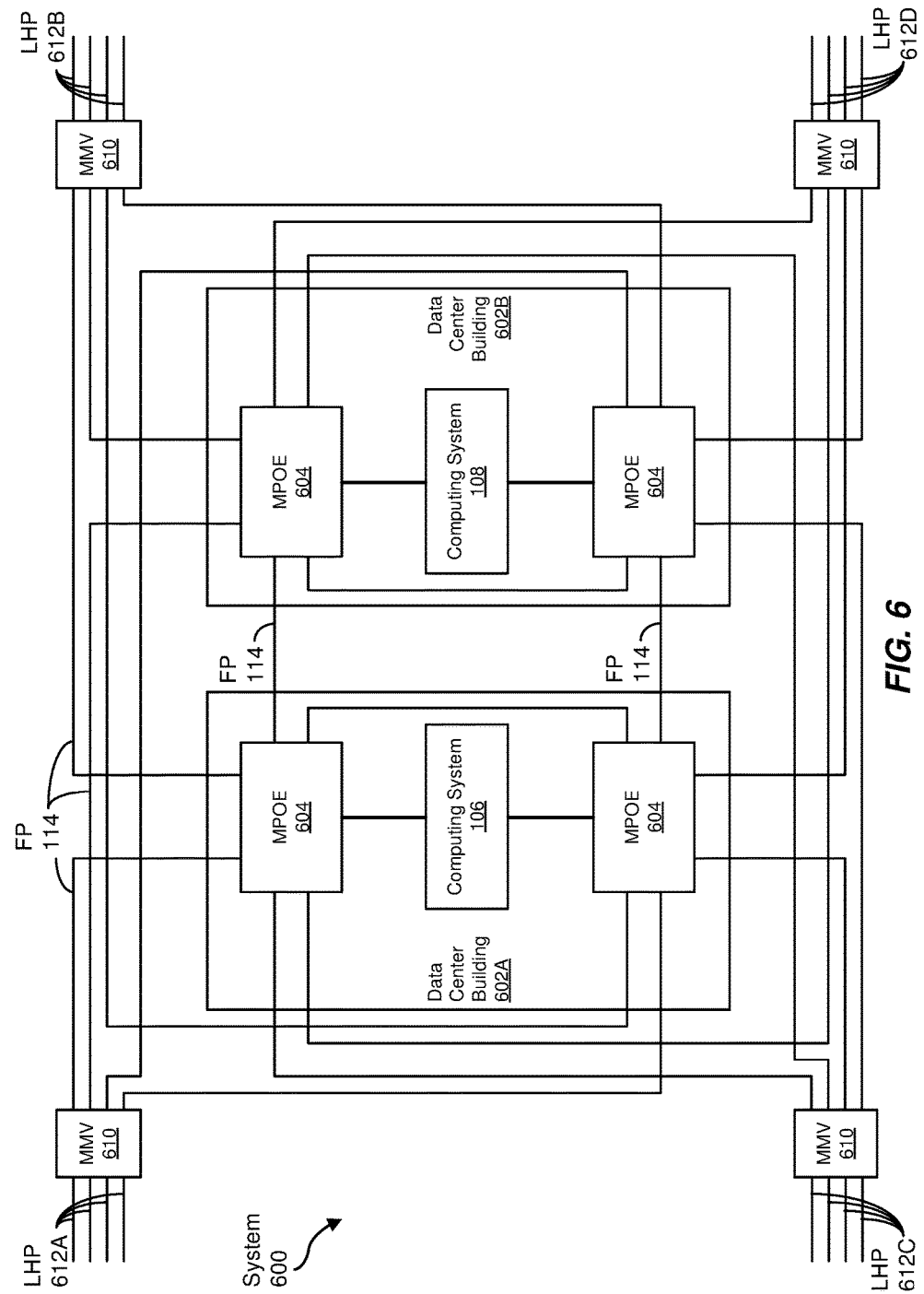
FIG. 6 is a block diagram of another example system for optical communication involving two data center buildings.

In the embodiments of FIGS. 1 and 5, each first MPOE 104, 504 of each data center building 102, 502 is coupled with a fiber optic pair 114 of each of a first half of long-haul paths 112, 512, while each second MPOE 104, 504 of each data center building 102, 502 is coupled with a fiber optic pair 114 of each of a second half of long-haul paths 112, 512. FIG. 6 is a block diagram of another example system 600 for optical communication involving two data center buildings 602A and 602B, in which a fiber optic pair 114 of each of four long-haul paths 612A-612D may be coupled to each MPOE 604 of each data center building 602. More specifically, data center building 602A may include first and second MPOEs 604 coupled to computing system 106, while data center building 602A may include first and second MPOEs 604 coupled to computing system 108. In some examples, each of four long-haul paths 612A-612D may include four fiber optic pairs 114, each of which may be coupled to a separate MPOE 604 of a separate data center building 602 via an MMV 610. In some examples, each first and second MPOE 604 of each data center building 602 may also be coupled to the corresponding MPOE 604 in the other data center building 602, as well as the opposing MPOE 604 in the same data center building 602, as illustrated in FIG. 6.

In some embodiments, by coupling each long-haul path 612 to each available MPOE 604 of each data center building 502, the failure of any single MPOE 604 may allow all long-haul paths 612 to continue to be serviced while impacting only 25% of the total available capacity, which may be distributed evenly across long-haul paths 612. Moreover, the failure of an entire data center building 602 may allow all long-haul paths 612 to continue to be serviced while impacting 50% of the total available capacity, which again may be distributed evenly across long-haul paths 612.

Figure 7:
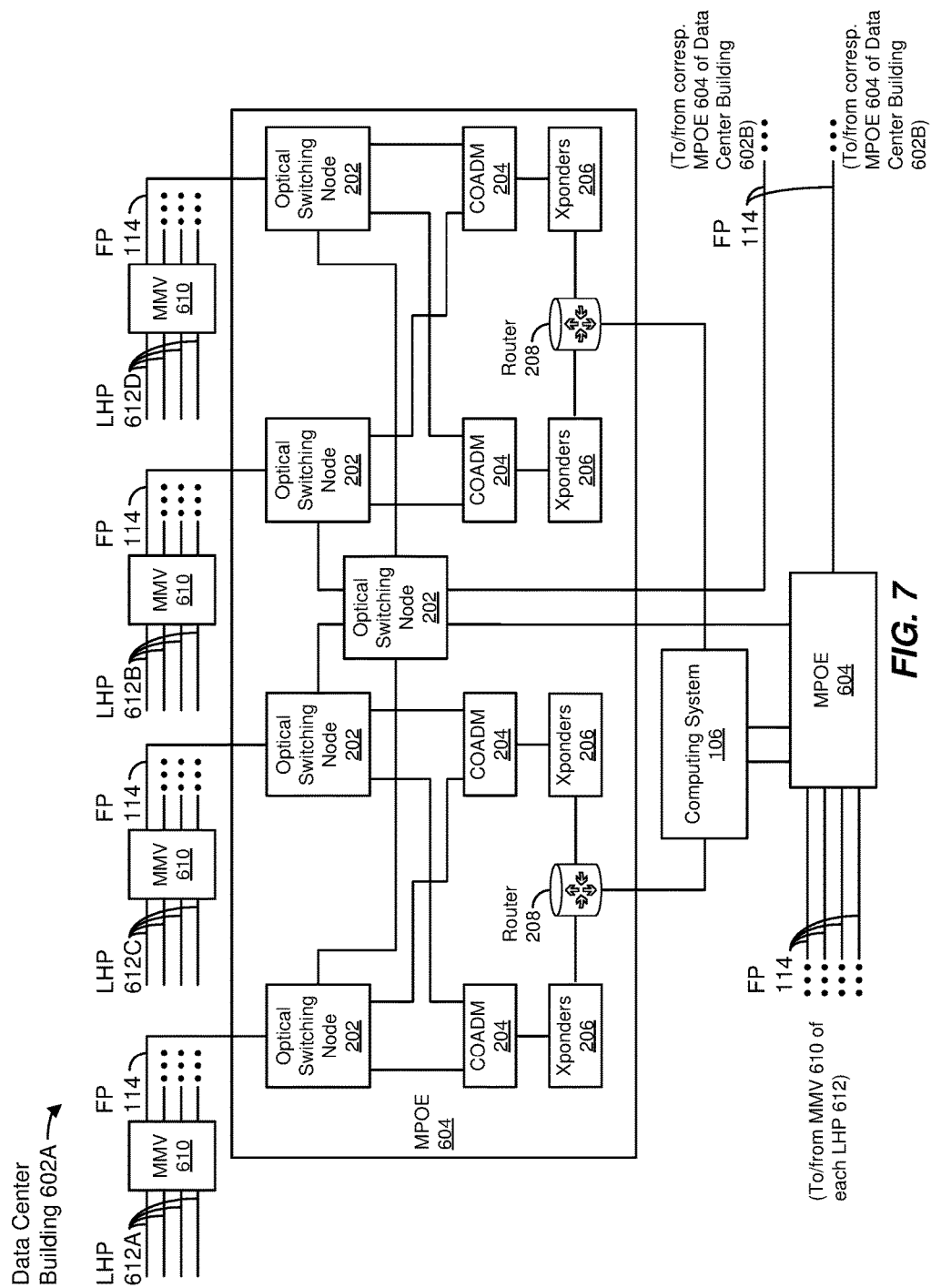
FIG. 7 is a block diagram of an example system portion of the system of FIG. 6 within one of the multiple data center buildings.

FIG. 7 is a block diagram of an example of data center building 602A. While only first MPOE 604 of data center building 602A is depicted in detail, second MPOE 604 of data center building 602A, as well as both MPOEs 604 of data center building 602B, may be similarly constructed in at least some embodiments. In some examples, optical switching nodes 202, COADMs 204, transponders 206, and/or routers 208 may be of similar construction to those of FIG. 2, and may include different numbers of inputs and/or outputs, as described below.

As shown in FIG. 7, in a manner similar to that of FIG. 2, first long-haul path 612A may be coupled to a first optical switching node 202, while second long-haul path 612C may be coupled to a second optical switching node 202. First and second optical switching nodes 202 may also be coupled to both first and second COADMs 204, as well as to each other and to a third optical switching node 202 that, in turn, is coupled to second MPOE 604 of data center building 602A, as well as to first MPOE 604 of second data center building 602B. Additionally, first and second COADMs 204 may each be coupled to corresponding transponders 206, which may be coupled to a first router 208.

Also as FIG. 7 illustrates, third long-haul path 612B may be coupled to a fourth optical switching node 202, while fourth long-haul path 612D may be coupled to a fifth optical switching node 202. Fourth and fifth optical switching nodes 202 may also be coupled to both a third and a fourth COADM 204, as well as to each other and to third optical switching node 202, mentioned above. In addition, third and fourth COADMs 204 may each be coupled to corresponding transponders 206, which may be coupled to a second router 208. Consequently, in some examples, while third optical switching node 202 may be of degree 6, the other components of MPOE 604 may be the same as those described above in conjunction with FIG. 2. Moreover, use of second router 208 in MPOE 604 may provide greater fault tolerance over the use of a single router 208.

The use of additional optical switching nodes 202, COADMs 204, transponders 206, and routers 208, as depicted in FIG. 7, may provide corresponding additional redundancy and fault tolerance within a single MPOE 604. In other embodiments, one or more modifications to MPOE 604 may be made to address one or more design constraints. For example, each fiber optic pair 114 of each long-haul path 612 may be associated with a dedicated COADM 204 to simplify the design of MPOE 604. In other examples, each COADM 204 may be shared with three or four long-haul paths 612, as opposed to the two depicted in FIG. 7. Other modifications of MPOE 604 are also possible.

In other examples, in a manner similar to that of FIGS. 1 and 5, additional data center buildings 602 may be incorporated into the data center system 600 of FIG. 6, thus increasing capacity, component redundancy, and path diversity with reasonable scaling.

As with the data center system 100 of FIGS. 1 and 2, a control system may configure, as well as reconfigure from time to time, optical switching nodes 202, COADMs 204, and other components of each MPOE 604 of FIG. 6, either automatically or under the control of a system operator.

Figure 8:
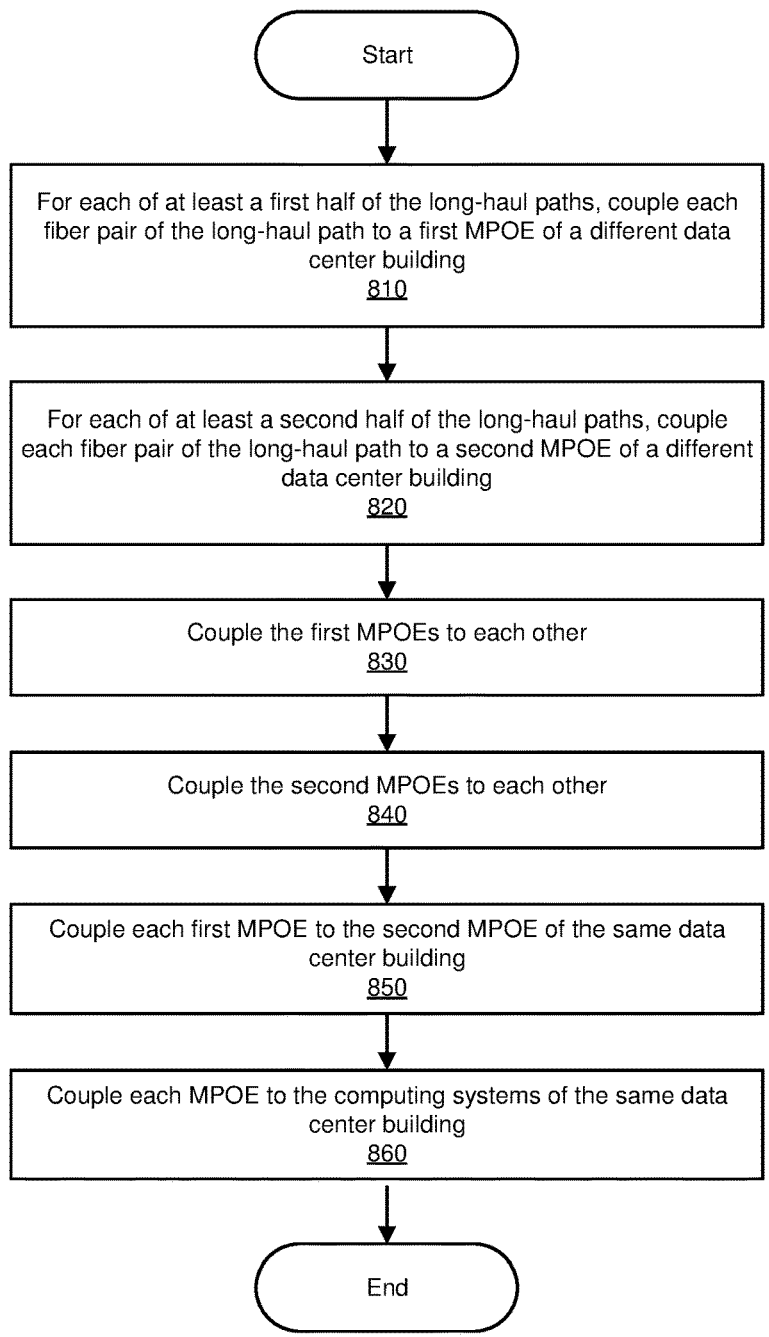
FIG. 8 is a flow diagram of an example method for multiple data center building optical communications.

FIG. 8 is a flow diagram of an example method 800 for multiple data center building optical communications. At step 810, for each of at least a first half of a number of available long-haul paths (e.g., long-haul paths 112, 512, or 612), each fiber pair of the long-haul path may be coupled to a first MPOE (e.g., MPOE 104, 504, or 604) of a different data center building (e.g. data center building 102, 502, or 602). At step 820, for each of at least a second half of the number of available long-haul paths, each fiber pair of the long-haul path may be coupled to a second MPOE of a different data center building. Using FIG. 1 as an example, each fiber pair of each long-haul path 112A and 112B is coupled to first MPOE 104 of a different data center building 102A and 102B, while each fiber pair of each long-haul path 112C and 112D is coupled to second MPOE 104 of a different data center building 102A and 102B. In the embodiments of FIG. 5, each fiber pair of each long-haul path 512A, 512B, and 512C is coupled to first MPOE 504 of a different data center building 502A, 502B, and 502C, while each fiber pair of each long-haul path 512D, 512E, and 512F is coupled to second MPOE 504 of a different data center building 502A, 502B, and 502C. In the examples of FIG. 6, each fiber pair of each long-haul path 612A-612D is coupled to a corresponding one of both first and second MPOEs 504 of both data center buildings 602A and 602B.

At step 830, the first MPOEs may be coupled to each other, and at step 840, each of the second MPOEs may be coupled to each other. Again using FIG. 1 as an example, first MPOE 104 of each data center building 102A and 102B are coupled to each other, as are second MPOE 104 of each data center building 102A and 102B. In embodiments described in conjunction with FIG. 5, first MPOE 504 of each data center building 502A-502C are coupled to each other, as are second MPOE 504 of each data center building 502A-502C. In the examples of FIG. 6, first MPOE 604 of each data center building 602A and 602B are coupled to each other, as are second MPOE 604 of each data center building 602A and 602B.

At step 850, the first MPOE may be coupled to the second MPOE in each data center building. For example, first MPOE 104 is coupled to second MPOE 104 in each data center building 102A and 102B of FIG. 1, first MPOE 504 is coupled to second MPOE 504 in each data center building 502A, 502B, and 502C of FIG. 5, and first MPOE 604 is coupled to second MPOE 604 in each data center building 602A and 602B of FIG. 6.

At step 860, each MPOE may be coupled to the one or more computing systems in the same data center building. As shown in FIG. 1, first and second MPOEs 104 of first data center building 102A are coupled to computing system 106, while first and second MPOEs 104 of second data center building 102B are coupled to computing system 108. In FIG. 5, as another example, first and second MPOEs 504 of first data center building 502A are coupled to computing system 106, first and second MPOEs 504 of second data center building 502B are coupled to computing system 108, and first and second MPOEs 504 of third data center building 502C are coupled to computing system 107. As to FIG. 6, first and second MPOEs 604 of first data center building 602A are coupled to computing system 106, while first and second MPOEs 604 of second data center building 602B are coupled to computing system 108.

Method 800, in other examples, may also be applied to the data center of FIG. 5 having three data center buildings 502A, 502B, and 502C, as indicated above, as well as data centers employing greater numbers of buildings. Further, in other embodiments, method 800 may be applied to the data center of FIG. 6 having two data center buildings 602A and 602B, as discussed above, as well as system architectures similar to FIG. 6 and associated FIG. 7 (e.g., two or more separate connections to computing system 106 or 108) that have more than two data center buildings.

As explained above in conjunction with FIGS. 1-8, the optical communication systems and methods for multiple data center buildings, as described herein, may provide increased path diversity to facilitate continued access to the data center over each long-haul path in the presence of many different types of component failures, such as those affecting routers, optical switching nodes, COADMs, and even an entire building. Moreover, by coupling one or more additional fiber optic pairs for each long-haul path to the data center, additional communication capacity is provided in concert with the additional computing capability facilitated by the addition of one or more data center buildings. Additionally, the systems and methods described herein are scalable beyond two data center buildings to three or more, thereby providing additional computing capacity and communication bandwidth with increased component redundancy and path diversity at a reasonable level of incremental system cost and complexity.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
a first optical switching node of a first main point of entry (MPOE) of a first data center building that communicatively couples a first fiber pair of a first long-haul optical path carrying a first plurality of optical channels to at least one computing system of the first data center building;
a second optical switching node of the first MPOE of the first data center building that communicatively couples a first fiber pair of a second long-haul optical path carrying a second plurality of optical channels to the at least one computing system of the first data center building; and
a third optical switching node of the first MPOE of the first data center building that communicatively couples the first optical switching node and the second optical switching node of the first MPOE of the first data center building to a second MPOE of the first data center building and a first MPOE of a second data center building.

2. The system of claim 1, further comprising:
a first colorless optical add-drop multiplexer (COADM) and a second COADM of the first MPOE of the first data center building, each of which couples the first optical switching node and the second optical switching node of the first MPOE of the first data center building to the at least one computing system of the first data center building.

3. The system of claim 2, further comprising:
at least one router of the first MPOE of the first data center building that is communicatively coupled to the at least one computing system of the first data center building;
a first set of transponders of the first MPOE of the first data center building that couples the first COADM of the first MPOE of the first data center building to the at least one router of the first MPOE of the first data center building; and
a second set of transponders of the first MPOE of the first data center building that couples the second COADM of the first MPOE of the first data center building to the at least one router of the first MPOE of the first data center building.

4. The system of claim 1, wherein each of first optical switching node, the second optical switching node, and the third optical switching node of the first MPOE of the first data center building comprises:
at least one amplifier that amplifies at least one optical channel for transmission on the first long-haul optical path or the second long-haul optical path;
at least one wavelength selective switch (WSS) that routes at least one optical channel to at least one other optical switching node; and
at least one optical splitter coupled to the at least one WSS.

5. The system of claim 1, further comprising:
a first optical switching node of the first MPOE of the second data center building that communicatively couples a second fiber pair of the first long-haul optical path carrying a third plurality of optical channels to at least one computing system of the second data center building;
a second optical switching node of the first MPOE of the second data center building that communicatively couples a second fiber pair of the second long-haul optical path carrying a fourth plurality of optical channels to the at least one computing system of the second data center building; and
a third optical switching node of the first MPOE of the second data center building that communicatively couples the first optical switching node and the second optical switching node of the first MPOE of the second data center building to a second MPOE of the second data center building and the third optical switching node of the first MPOE of the first data center building.

6. The system of claim 5, further comprising:
a first meet-me vault (MMV) that is coupled to the first optical switching node of the first MPOE of the first data center building via the first fiber pair of the first long-haul optical path and to the first optical switching node of the first MPOE of the second data center building via the second fiber pair of the first long-haul optical path; and
a second MMV that is coupled to the second optical switching node of the first MPOE of the first data center building via the first fiber pair of the second long-haul optical path and to the second optical switching node of the first MPOE of the second data center building via the second fiber pair of the second long-haul optical path.

7. The system of claim 1, further comprising:
a fourth optical switching node of the first MPOE of the first data center building that communicatively couples a third fiber pair of a third long-haul optical path carrying a third plurality of optical channels to the at least one computing system of the first data center building; and
a fifth optical switching node of the first MPOE of the first data center building that communicatively couples a fourth fiber pair of a fourth long-haul optical path carrying a fourth plurality of optical channels to the at least one computing system of the first data center building;
wherein the third optical switching node of the first MPOE of the first data center building communicatively couples the fourth optical switching node and the fifth optical switching node of the first MPOE of the first data center building to the second MPOE of the first data center building and the first MPOE of the second data center building.

8. The system of claim 1, wherein:
the first data center building receives electrical power from a first point of attachment to an electrical grid; and
the second data center building receives electrical power from a second point of attachment to the electrical grid different from the first point of attachment.

9. The system of claim 1, further comprising:
a first optical switching node of the second MPOE of the first data center building that communicatively couples a first fiber pair of a third long-haul optical path carrying a third plurality of optical channels to the at least one computing system of the first data center building;
a second optical switching node of the second MPOE of the first data center building that communicatively couples a first fiber pair of a fourth long-haul optical path carrying a fourth plurality of optical channels to the at least one computing system of the first data center building; and
a third optical switching node of the second MPOE of the first data center building that communicatively couples the first optical switching node and the second optical switching node of the second MPOE of the first data center building to a second MPOE of the second data center building and the third optical switching node of the first MPOE of the first data center building.

10. The system of claim 9, further comprising:
a first optical switching node of the first MPOE of the second data center building that communicatively couples a second fiber pair of the first long-haul optical path carrying a fifth plurality of optical channels to at least one computing system of the second data center building;
a second optical switching node of the first MPOE of the second data center building that communicatively couples a second fiber pair of the second long-haul optical path carrying a sixth plurality of optical channels to the at least one computing system of the second data center building;
a first optical switching node of the second MPOE of the second data center building that communicatively couples a second fiber pair of the third long-haul optical path carrying a seventh plurality of optical channels to at least one computing system of the second data center building;
a second optical switching node of the second MPOE of the second data center building that communicatively couples a second fiber pair of the fourth long-haul optical path carrying an eighth plurality of optical channels to the at least one computing system of the second data center building;
a third optical switching node of the first MPOE of the second data center building that communicatively couples the first optical switching node and the second optical switching node of the first MPOE of the second data center building to the second MPOE of the second data center building and the third optical switching node of the first MPOE of the first data center building; and
a third optical switching node of the second MPOE of the second data center building that communicatively couples the first optical switching node and the second optical switching node of the second MPOE of the second data center building to the third optical switching node of the first MPOE of the second data center building and the third optical switching node of the second MPOE of the first data center building.

11. A system comprising:
a first main point of entry (MPOE) of a first data center building coupled to a first fiber pair of a first long-haul optical path and a first fiber pair of a second long-haul optical path;
a first MPOE of a second data center building coupled to a second fiber pair of the first long-haul optical path, a second fiber pair of the second long-haul optical path, and the first MPOE of the first data center building;
a second MPOE of the first data center building coupled to a first fiber pair of a third long-haul optical path, a first fiber pair of a fourth long-haul optical path, and the first MPOE of the first data center building; and
a second MPOE of the second data center building coupled to a second fiber pair of the third long-haul optical path, a second fiber pair of the fourth long-haul optical path, the first MPOE of the second data center building, and the second MPOE of the first data center building;
wherein the first MPOE and the second MPOE of the first data center building are coupled to at least one computing system of the first data center building, and the first MPOE and the second MPOE of the second data center building are coupled to at least one computing system of the second data center building.

12. The system of claim 11, further comprising:
a first MPOE of a third data center building coupled to a third fiber pair of the first long-haul optical path, a third fiber pair of the second long-haul optical path, the first MPOE of the first data center building, and the first MPOE of the second data center building; and
a second MPOE of the third data center building coupled to a third fiber pair of the third long-haul optical path, a third fiber pair of the fourth long-haul optical path, the second MPOE of the first data center building, the second MPOE of the second data center building, and the first MPOE of the third data center building;
wherein the first MPOE and the second MPOE of the third data center building are coupled to at least one computing system of the third data center building.

13. The system of claim 11, wherein the first MPOE of the first data center building comprises:
at least one router coupled to the at least one computing system of the first data center building;
a first optical switching node that couples the first fiber pair of the first long-haul optical path to the at least one router; and
a second optical switching node that couples the first fiber pair of the second long-haul optical path to the at least one router.

14. The system of claim 13, where the first MPOE of the first data center building further comprises:
a third optical switching node that couples the first optical switching node and the second optical switching node to the first MPOE of the second data center building and the second MPOE of the first data center building.

15. A method comprising:
communicatively coupling, by a first optical switching node of a first main point of entry (MPOE) of a first data center building, a first fiber pair of a first long-haul optical path carrying a first plurality of optical channels to at least one computing system of the first data center building;
communicatively coupling, by a second optical switching node of the first MPOE of the first data center building, a first fiber pair of a second long-haul optical path carrying a second plurality of optical channels to the at least one computing system of the first data center building; and
communicatively coupling, by a third optical switching node of the first MPOE of the first data center building, the first optical switching node and the second optical switching node of the first MPOE of the first data center building to a second MPOE of the first data center building and a first MPOE of a second data center building.

16. The method of claim 15, further comprising:
communicatively coupling, by a first optical switching node of the first MPOE of the second data center building, a second fiber pair of the first long-haul optical path carrying a third plurality of optical channels to at least one computing system of the second data center building;
communicatively coupling, by a second optical switching node of the first MPOE of the second data center building, a second fiber pair of the second long-haul optical path carrying a fourth plurality of optical channels to the at least one computing system of the second data center building; and communicatively coupling, by a third optical switching node of the first MPOE of the second data center building, the first optical switching node and the second optical switching node of the first MPOE of the second data center building to a second MPOE of the second data center building and the third optical switching node of the first MPOE of the first data center building.

17. The method of claim 15, further comprising:

communicatively coupling, by a first optical switching node of the second MPOE of the first data center building, a first fiber pair of a third long-haul optical path carrying a third plurality of optical channels to the at least one computing system of the first data center building;

communicatively coupling, by a second optical switching node of the second MPOE of the first data center building, a first fiber pair of a fourth long-haul optical path carrying a fourth plurality of optical channels to the at least one computing system of the first data center building; and communicatively coupling, by a third optical switching node of the second MPOE of the first data center building, the first optical switching node and the second optical switching node of the second MPOE of the first data center building to a second MPOE of the second data center building and the third optical switching node of the first MPOE of the first data center building.

18. The method of claim 17, further comprising:

communicatively coupling, by a first optical switching node of the first MPOE of the second data center building, a second fiber pair of the first long-haul optical path carrying a fifth plurality of optical channels to at least one computing system of the second data center building;

communicatively coupling, by a second optical switching node of the first MPOE of the second data center building, a second fiber pair of the second long-haul optical path carrying a sixth plurality of optical channels to the at least one computing system of the second data center building;

communicatively coupling, by a first optical switching node of the second MPOE of the second data center building, a second fiber pair of the third long-haul optical path carrying a seventh plurality of optical channels to at least one computing system of the second data center building;

communicatively coupling, by a second optical switching node of the second MPOE of the second data center building, a second fiber pair of the fourth long-haul optical path carrying an eighth plurality of optical channels to the at least one computing system of the second data center building;

communicatively coupling, by a third optical switching node of the first MPOE of the second data center building, the first optical switching node and the second optical switching node of the first MPOE of the second data center building to the second MPOE of the second data center building and the third optical switching node of the first MPOE of the first data center building; and communicatively coupling, by a third optical switching node of the second MPOE of the second data center building, to the first optical switching node and the second optical switching node of the second MPOE of the second data center building, the third optical switching node of the first MPOE of the second data center building, and the third optical switching node of the second MPOE of the first data center building.

19. The method of claim 15, further comprising:

coupling, using a first COADM of the first MPOE of the first data center building, the first optical switching node and the second optical switching node of the first MPOE of the first data center building to the at least one computing system of the first data center building; and coupling, using a second COADM of the first MPOE of the first data center building, the first optical switching node and the second optical switching node of the first MPOE of the first data center building to the at least one computing system of the first data center building.

20. The method of claim 19, further comprising:

coupling, using at least one router, the first COADM and the second COADM of the first MPOE of the first data center building to the at least one computing system of the first data center building;

converting, using a first set of transponders, between an optical signal protocol of the first COADM and an electrical signal protocol of the at least one router; and converting, using a second set of transponders, between an optical signal protocol of the second COADM and the electrical signal protocol of the at least one router.

* * * * *